(12) United States Patent
Cramer et al.

(10) Patent No.: US 11,898,226 B2
(45) Date of Patent: Feb. 13, 2024

(54) ADDITIVE MANUFACTURING PROCESS FOR PRODUCING ALUMINUM-BORON CARBIDE METAL MATRIX COMPOSITES

(71) Applicant: UT-Battelle, LLC, Oak Ridge, TN (US)

(72) Inventors: Corson L. Cramer, Knoxville, TN (US); James O. Kiggans, Jr., Oak Ridge, TN (US); Amelia M. Elliott, Knoxville, TN (US); David C. Anderson, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 165 days.

(21) Appl. No.: 16/800,012

(22) Filed: Feb. 25, 2020

(65) Prior Publication Data

US 2020/0269318 A1    Aug. 27, 2020

Related U.S. Application Data

(60) Provisional application No. 62/810,538, filed on Feb. 26, 2019.

(51) Int. Cl.
*C22C 29/06* (2006.01)
*C22C 32/00* (2006.01)
(Continued)

(52) U.S. Cl.
CPC .......... *C22C 29/062* (2013.01); *B22F 3/1021* (2013.01); *B33Y 10/00* (2014.12);
(Continued)

(58) Field of Classification Search
CPC .............. C04B 41/5155; C22C 29/062; C22C 32/0057
See application file for complete search history.

(56) References Cited

U.S. PATENT DOCUMENTS 5,508,120 A * 4/1996 Pyzik ...................... C04B 35/65
428/688
5,521,016 A * 5/1996 Pyzik ..................... C22C 1/1036
419/10

(Continued)

OTHER PUBLICATIONS

Peurrung, A. J., et al. Long Range Neutron Detection: A Progress Report. No. PNNL-11995. Pacific Northwest National Laboratory, Richland, WA, 1998. (Year: 1998).*

(Continued)

*Primary Examiner* — Sally A Merkling
*Assistant Examiner* — Sean P. O'Keefe
(74) *Attorney, Agent, or Firm* — Scully, Scott, Murphy & Presser, P.C.

(57) ABSTRACT

A method for additive manufacturing of a composite object containing a bonded network of boron carbide particles and aluminum occupying spaces between boron carbide particles, the method comprising: (i) producing a porous preform constructed of boron carbide by an additive manufacturing process in which particles of boron carbide are bonded together; and (ii) infiltrating molten aluminum, at a temperature of 1000-1400° C., into pores of said porous preform to produce said composite object constructed of boron carbide particles within an aluminum matrix, wherein the boron carbide is present in the composite object in an amount of 30-70 wt. %. The resulting composite material is also herein described.

8 Claims, 11 Drawing Sheets

(51) Int. Cl.
  *B22F 3/10* (2006.01)
  *B33Y 70/10* (2020.01)
  *C04B 41/51* (2006.01)
  *C22C 1/10* (2023.01)
  *B33Y 10/00* (2015.01)
  *C04B 41/88* (2006.01)
  *C04B 41/00* (2006.01)

(52) U.S. Cl.
  CPC ............ *B33Y 70/10* (2020.01); *C04B 41/009* (2013.01); *C04B 41/5155* (2013.01); *C04B 41/88* (2013.01); *C22C 1/1036* (2013.01); *C22C 29/067* (2013.01); *C22C 32/0057* (2013.01); *B22F 2201/11* (2013.01); *B22F 2201/20* (2013.01); *B22F 2301/052* (2013.01); *B22F 2302/10* (2013.01); *B22F 2303/05* (2013.01); *B22F 2304/10* (2013.01)

(56) References Cited

U.S. PATENT DOCUMENTS

| | | | | |
|---|---|---|---|---|
| 5,672,435 | A * | 9/1997 | Born | G11B 5/8404 428/548 |
| 5,700,962 | A * | 12/1997 | Carden | G21F 1/08 376/288 |
| 5,980,602 | A * | 11/1999 | Carden | C22C 1/05 75/236 |
| 6,036,777 | A | 3/2000 | Sachs | |
| 2010/0104843 | A1 * | 4/2010 | Pyzik | C04B 35/563 428/220 |
| 2017/0335433 | A1 * | 11/2017 | Landry-Desy | G21F 1/08 |
| 2018/0250631 | A1 * | 9/2018 | Crawford | C04B 14/10 |

OTHER PUBLICATIONS

Cramer, C. L. et al., "Processing of complex-shaped collimators made via binder jet additive manufacturing of B4C and pressureless melt infiltration of Al*", Materials and Design, vol. 180, 107956, 9 pgs. (2019).

Halverson, D.C. et al., "Processing of Boron Carbide—Aluminum Composites", J. Am. Ceram. Soc., 72 (5): 775-780 (1989).

Lee, B.S. et al., "Low-temperature processing of B4C-Al composites via infiltration techniques", Materials Chemistry and Physics, vol. 67: 249-255 (2001).

Pyzik, A. J. et al., "Al—B—C Phase Development and Effects on Mechanical Properties of B4C/Al-Derived Composites", J. Am. Ceram. Soc., 78(2): 305-312 (1995).

Stone, M.B. et al., "Characterization of plastic and boron carbide additive manufactured neutron collimators", Review of Scientific Instruments, vol. 88, 123102, 8 pgs. (2017).

Topku, I. et al., "Processing and mechanical properties of B4C reinforced Al matrix composites", Journal of Alloys and Compounds 482: 516-521 (2009).

Tuncer, N. et al., "Effect of passivation and precipitation hardening on processing and mechanical properties of B4C-Al composites", Ceramics International 37: 2861-2867 (2011).

* cited by examiner

ADDITIVE MANUFACTURING PROCESS FOR PRODUCING ALUMINUM-BORON CARBIDE METAL MATRIX COMPOSITES

CROSS REFERENCE TO RELATED APPLICATION

The present application claims benefit of U.S. Provisional Application No. 62/810,538, filed on Feb. 26, 2019, all of the contents of which are incorporated herein by reference.

GOVERNMENT SUPPORT

This invention was made with government support under Prime Contract No. DE-AC05-000R22725 awarded by the U.S. Department of Energy. The government has certain rights in the invention.

FIELD OF THE INVENTION

The present invention relates generally to composites made of boron carbide particles and aluminum, and more particularly, methods of additive manufacturing of such composites.

BACKGROUND OF THE INVENTION

Collimators are used to reduce background and unwanted scatter of x-ray, gamma-ray, and neutron signals for imaging, directional sensitivity, and tomography characterization. Thermal neutron scattering instruments examine the structural and dynamic characteristics of materials. The neutrons typically have energies ranging from tens of microelectron volts to several kilo-electron volts. To collimate thermal neutrons with a compact device, isotopes with very large neutron-absorbing cross-sections, $\sigma_A$, need to be used. Typical materials include cadmium, $\sigma_A(Cd)=2,520$ b, boron, $\sigma_A(B)=767$ b, and gadolinium, $\sigma_A(Gd)=49,700$ b. The values listed here are based on 1.8 Å neutrons (25.25 meV). As neutron wavelength becomes shorter (energy becomes greater), the absorption cross section becomes smaller.

Neutron collimators, which typically utilize radial, Soller, or other geometries are commonly used with a varying number of blades in the same frame to increase or decrease the collimation of the beam (W. Soller, "A New Precision X-ray Spectrometer," *Phys. Rev.*, vol. 24, no. 2, pp. 158-167, August 1924). The blades can be made of thin strips of rigid neutron absorbers or stretched thin films that have been coated with neutron-absorbing compounds or single elements. For two-dimensional collimation, two Soller collimators oriented with blades orthogonal to one another can be used in series. This requires additional engineering to allow both collimators to occupy the same footprint within the instrument. An alternative to this arrangement is to produce a honeycomb or a rectangular grid of collimating elements in a single collimator (C. Petrillo et al., *Nucl. Instruments Methods Phys. Res. Sect. A Accel. Spectrometers, Detect. Assoc. Equip.*, vol. 489, no. 1-3, pp. 304-312, August 2002). Notably, these and many other alternative complex geometries, such as those containing tapers and curves, are relatively difficult to achieve.

Because boron carbide ($B_4C$) has favorable neutron absorbing properties, it is desirable as a collimator material. Since $B_4C$ generally possesses insufficient density on its own, $B_4C$ can be combined with aluminum (Al) to form a $B_4C$—Al composite (A. J. Pyzik et al., *J. Am Ceram. Soc.*, 78(2), 305-312, February 1995). The result is a high-density composite containing $B_4C$ particles in an Al matrix with one or more ternary phases that form during processing. However, current methods are generally incapable of producing $B_4C$—Al composites shaped into complex geometries suitable for collimator devices. Moreover, the currently known $B_4C$—Al composites generally possess a lower than desirable boron carbide content, e.g., boron carbide of less than 25 wt. % by weight of the composite. Thus, producing a $B_4C$—Al composite with a significantly higher boron carbide content would be a further significant advance in the field of $B_4C$—Al composites.

SUMMARY OF THE INVENTION

The present disclosure is foremost directed to a method for additive manufacturing (AM) of $B_4C$—Al composite objects constructed of a network of bonded boron carbide particles and aluminum metal or alloy thereof occupying spaces between boron carbide particles. The method includes at least the following steps: (i) producing a porous preform constructed of boron carbide by an additive manufacturing process in which particles of boron carbide are bonded together; and (ii) infiltrating molten aluminum, at a temperature of 1000-1400° C., into pores of the porous preform to produce the composite object constructed of boron carbide particles within an aluminum matrix, wherein the boron carbide is present in the composite object in an amount of 30-70 wt. %. The method disclosed herein can advantageously produce $B_4C$—Al composites shaped into complex geometries more suitable for collimator devices.

The method disclosed herein also advantageously produces $B_4C$—Al composites that possess a higher than conventional boron content, e.g., boron carbide of more than 25, 30, 35, 40, or 45 wt. % of the composite. In some embodiments, the boron carbide particles are enriched in boron-10 to increase neutron absorbing properties of the composite. Notably, manufacturing a collimator from a $B_4C$—Al composite by the present method is particularly advantageous because, unlike other additive manufacturing techniques, components manufactured using this method contain no hydrogen. Hydrogen is a strong incoherent scatterer of neutrons, and as such, is undesirable because of its contribution to neutron radiation background.

BRIEF DESCRIPTION OF THE FIGURES

(FIG. 4A), AA2024 at 1300° C. (FIG. 4B), AA2024 at 1200° C. (FIG. 4C), AA1100 at 1200° C. (FIG. 4D), and pure Al at 1200° C. (FIG. 4E), wherein AA2024 and AA1100 refer to specific types of aluminum alloys, as further discussed below.

DETAILED DESCRIPTION OF THE INVENTION

Figure 1A:
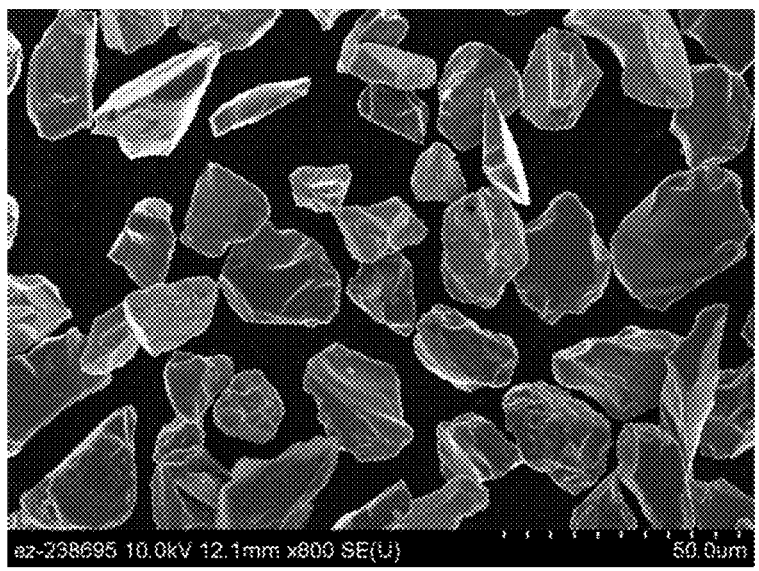
FIG. 1A is an SEM image of $B_4C$ powder used herein to make a porous preform by additive manufacturing.

The boron carbide (B$_4$C) particles, as used in the production method described herein and as present in the composite object produced by the method, typically have a size of at least 5 microns (i.e., 5 μm) and no more than 120 microns (i.e., in the range of 5-120 microns). In different embodiments, the boron carbide particles have a size of, for example, 5, 10, 15, 20, 25, 30, 35, 40, 45, 50, 60, 65, 70, 75, 80, 85, 90, 95, 100, 105, 110, or 120 microns, or a size within a range bounded by any two of the foregoing values (e.g., 5-120, 5-100, 5-75, 5-50, or 10-30 microns). The boron carbide particles may be included in the composite in any suitable amount, e.g., 5, 10, 15, 20, or 25 wt. %, or an amount within a range therein (e.g., 5-25 wt. %). In preferred embodiments, the boron carbide particles are included in the composite in an amount of at least or more than 30, 35, 40, 45, 50, 55, 60, 65, or 70 wt. % or range bounded by any two of the foregoing amounts (e.g., 20-70 wt. %, 25-70 wt. %, 30-70 wt. %, 35-70 wt. %, 20-60 wt. %, 30-60 wt. %, or 35-60 wt. %). In some embodiments, boron carbide particles are present as the only type of particles in contact with the pore-filling aluminum component within the composite. In other embodiments, one or more additional types of particles are included in the composite. The additional type of particles may have a composition selected from, for example, elemental carbon, an inorganic oxide (e.g., SiO$_2$), or another carbide (i.e., other than boron carbide, e.g., SiC or WC), generally in an amount of no more than or less than 5, 2, 1, 0.5, or 0.1 wt. %. In some embodiments, any one or more of the foregoing additional components are excluded from the composite and method.

Generally, the term "size," as used herein, refers to a distribution of particle sizes over a specified range of sizes, such as any of the possible size ranges provided above. In some embodiments, particles having a size outside of a specified range are excluded. For example, for a size range of 5-120 microns for boron carbide particles, boron carbide particles having a size over 120 microns may be excluded (i.e., 100 wt. % or 100 vol. % of the particles are within the indicated size range). In other embodiments, at least or more than 75, 80, 85, 90, 95, 98, or 99 wt. % (or vol. %) of the particles are within a specified size range, such as any of the size ranges provided above, which thus permits some amount of the particles (i.e., up to or less than 25, 20, 15, 10, 5, 2, or 1 wt. % or vol. %, respectively) to reside outside of the indicated size range. The particle size may be further or alternatively expressed in terms of a size distribution parameter D, such as $D_{50}$, $D_{10}$, and $D_{90}$, as well known in the art. The $D_{50}$, $D_{10}$, or $D_{90}$ for the B$_4$C particles may be selected from, for example, any of the specific exemplary particle size values provided above. In particular embodiments, $D_{50}$, $D_{10}$, or $D_{90}$ is selected from 5, 10, 15, 20, 25, 30, 35, or 40 microns, or a value within a range bounded by any two of the foregoing values.

In some embodiments, the boron carbide particles are enriched in boron-10 (B-10 or $^{10}$B), an isotope of boron which has a higher neutron absorbing cross-section. Boron carbide particles containing $^{10}$B are herein referred to as $^{10}$B$_4$C particles. As natural boron contains $^{10}$B in an amount of approximately 20 atom %, the term "enriched," as used herein, corresponds to a $^{10}$B concentration of greater than 20 atom %. Thus, non-enriched (0% $^{10}$B-enriched) B$_4$C particles contain approximately 20 atom % of $^{10}$B, while 10% enriched B$_4$C particles contain approximately 28 atom % of $^{10}$B; 20% enriched B$_4$C particles contain approximately 36 atom % of $^{10}$B; 30% enriched B$_4$C particles contain approximately 44 atom % of $^{10}$B; 40% enriched B$_4$C particles contain approximately 52 atom % of $^{10}$B; 50% enriched B$_4$C particles contain approximately 60 atom % of $^{10}$B; 60% enriched B$_4$C particles contain approximately 68 atom % of $^{10}$B; 70% enriched B$_4$C particles contain approximately 76 atom % of $^{10}$B; 80% enriched B$_4$C particles contain approximately 84 atom % of $^{10}$B; 90% enriched B$_4$C particles contain approximately 92 atom % of $^{10}$B; and 100% enriched B$_4$C particles contain 100 atom % of $^{10}$B. The B$_4$C particles may be enriched within a range bounded by any two of the foregoing exemplary values for percent enriched or atom %, e.g., 0-100% enriched or 20-100 atom % $^{10}$B. In some embodiments, the highest $^{10}$B-enriched commercially available B$_4$C is 96 atom %. Thus, in some embodiments, the B$_4$C may be enriched within a range spanning any of the foregoing exemplary amounts and 96 atom % (e.g., 20-96 atom % or 30-96 atom %).

The aluminum (Al), as used in the method described herein and as present as a matrix or space-filler (i.e., "pore-filler") in the composite object produced by the method, is either pure aluminum (i.e., 100 wt. % Al) or an aluminum alloy in which aluminum is present in an amount of at least or more than 50 wt. %, 60 wt. %, 70 wt. %, 80 wt. %, 90 wt. %, 95 wt. %, 98 wt. %, or 99 wt. % (by weight of the composite). In the case of the aluminum matrix being an aluminum alloy, the aluminum alloy may be any of the known series of aluminum alloys. Some examples of aluminum alloys include the 1000 series (e.g., AA 1100), 2000 series (e.g., AA 2024), 3000 series (e.g., AA 3003), 4000 series (e.g., AA 4043), 5000 series (e.g., AA 5052), 6000 series (e.g., AA 6061), 7000 series (e.g., AA 7075), or 8000 series (e.g., AA 8006). In some embodiments, one or more of the foregoing specific alloy types may be excluded from the aluminum, or aluminum alloys may be altogether excluded (i.e., only pure aluminum is used).

Notably, in the $B_4C$—Al composite described above, the boron carbide particles are bonded to each other as an extended bonded network of boron carbide particles present throughout the composite object, and the bonded network of boron carbide particles provide the shape of the composite object. Thus, unlike some conventional composites of the art, the boron carbide particles in the composite object described herein are not completely surrounded by an aluminum matrix since the boron carbide particles are interconnected with each other. The aluminum occupies pore spaces between bonded particles or between regions of bonded particles, but the aluminum cannot completely surround each particle. Moreover, while some conventional composites of the art rely on the aluminum as a shape-defining material and matrix within which boron carbide particles are incorporated, the composite described herein relies on the network of bonded boron carbide particles as the shape-defining component within which aluminum is infiltrated.

In a first step (i.e., "step (i)") of the method for producing the above-described composite, a porous preform constructed of boron carbide particles is produced by an additive manufacturing (AM) process. As well known in the art, an AM process operates by constructing an object layer-by-layer, typically under the instruction of a computer graphic file. The AM process may also be referred to as a "3D printing" process. The AM process can be any of the direct or indirect AM processes known in the art, provided that the resulting preform is porous. Direct additive manufacturing processes typically rely on heat for welding (i.e., fusing or sintering) the particles together during the manufacturing (bonding) process. An example of a direct AM process is selective laser sintering (SLS). For purposes of the invention, the indirect AM process is typically an indirect ceramic additive manufacturing (ICAM) process. The ICAM process typically operates by bonding ceramic particles together with an organic binder layer-by-layer to construct an object.

The ICAM process can be any of the indirect manufacturing processes known in the art capable of using ceramic or metal powder to construct a porous preform. The shape of the object being built can include any level of detail made possible by ICAM processes of the art. The ICAM process operates by bonding particles to each other with an organic binder to construct a porous preform that is subsequently debinded and optionally subsequently sintered. The ICAM process may be, for example, a binder jetting, lithography-based ceramic manufacturing (i.e., ceramic photolithography), or direct-ink-writing (DIW) process (also known as robocasting), all of which are well known in the art (see, e.g., U.S. Pat. No. 6,036,777 for binder jetting; S. Nohut et al., "Ceramic Additive Manufacturing via Lithography," Ceramic Industry, pp. 22-26, October 2018 for lithography-based ceramic manufacturing; and J. A. Lewis, *Adv. Funct. Mater.*, 16, 2193-2204 for DIW process).

In particular embodiments, the ICAM process is a binder jetting process, as well known in the art. The binder jetting process is described in detail in, for example, U.S. Pat. Nos. 6,036,777, 10,040,216, and X. Lv et al., *Ceramics International*, 45(10), 12609-12624, July 2019, the contents of which are herein incorporated by reference in their entirety. In the binder jetting process, a powder or powder mixture (i.e., boron carbide powder, either alone or optionally with an additional powder) is fed into a binder jetting manufacturing device (BJMD) as a build material. The powder is typically dispensed as a layer (bed) of build material on a vertically movable platform within the BJMD. An organic binder, either alone or admixed with a solvent, is separately fed into the BJMD and routed to a printhead positioned over the bed of powder mixture. The organic binder may be any of the binders well known in the art of binder jetting, such as a polymer (e.g., adhesive substance) or curable monomer. In particular embodiments, the organic binder is or includes a polyol-based (e.g., glycol-based) binder, phenolic binder (e.g., phenolic resin), cyanoacrylate, or furfuryl-based binder (e.g., furfuryl alcohol-based binder). The organic binder may or may not also include crosslinkable functional groups. Polymers containing crosslinkable groups are well known in the art, such as generally described in U.S. Pat. No. 7,287,587, the contents of which are herein incorporated by reference. The crosslinkable polymer may be, for example, any of the numerous epoxide-containing crosslinkable polymers known in the art; or, for example, any of the formaldehyde-containing polymers, such as a phenol-formaldehyde, formaldehyde-amine, or phenol-formaldehyde-amine polymer, such as described in A. Chernykh et al., *Polymer*, vol. 47, no. 22, pp. 7664-7669, 2006, the contents of which are herein incorporated by reference; or, for example, any of the crosslinkable polymers based on benzocyclobutene, such as described in K. A. Walker et al., Polymer, vol. 35, no. 23, pp. 5012-5017; or, for example, any of the vinyl ester resins and unsaturated polyester resins known in the art, such as described in S. Jaswal et al., *Rev. Chem. Eng.*, 30(6), pp. 567-581, 2014.

Based on instructions provided by a computer program, as generally provided by a computer-aided manufacturing (CAM) software package, the printhead is directed to dispense selectively positioned droplets of the binder onto the powder bed to form a first layer of the article being built. The printhead can be an inkjet printhead, as well known in the art. Thus, the droplets of the binder can be precisely positioned in various locations on the powder bed to form a first layer of the article being built. As well known in the art of binder jetting, once a first layer of the article is built, the platform holding the powder bed is lowered by an amount equivalent to a layer thickness. A subsequent layer of the object is built by selectively depositing a second set of selectively positioned droplets of the binder. The platform holding the powder bed is then lowered again by another layer thickness, and the process is continued until a preform having the shape of the object to be built is produced. For purposes of the present invention, the preform produced by the ICAM process is porous and is constructed of particles of the powder mixture described above bonded together with the organic binder. The above described binder jetting process is meant to be exemplary, and numerous modifications of the above described process can be made. Generally, the $B_4C$ preform, produced as above, possesses a theoretical density (TD) of 45, 50, 55, 60, or 65% or within a range therein.

When a porous preform constructed of boron carbide particles bonded with organic binder is produced, before step (ii), the porous preform is typically subjected to a debinding step in which the porous preform is subjected to a temperature of 500-800° C., 500-850° C., or 500-900° C. to volatilize the organic binder to produce a binder-free porous preform. The term "binder-free" indicates that no organic binder remains in the porous preform after the debinding step, which occurs most efficiently when using a hydrogen and/or argon gas atmosphere. In different embodiments, the debinding step is conducted at a temperature of, for example, 500, 525, 550, 575, 600, 625, 650, 675, 700, 725, 750, 775, 800, 825, 850, 875, or 900° C., or a debinding temperature within a range bounded by any two of the foregoing values (e.g., 500-900° C., 500-800° C., 500-700° C., or 575-775° C.).

Typically, the porous preform is heated gradually either to reach a debinding temperature from a lower temperature, or to gradually increase in temperature within the debinding temperature range, or both. The gradual increase in temperature is defined by a rate of temperature increase (i.e., increasing temperature gradient). The rate of temperature increase may be, for example, 1° C./min, 2° C./min, 5° C./min, 10° C./min, 15° C./min, or 20° C./min, or a rate of temperature increase within a range bounded by any two of the foregoing values (e.g., 1-20° C./min, 2-20° C./min, or 5-15° C./min). In a first embodiment, the porous preform transitions abruptly from room temperature (i.e., at the end of step (i) when the porous preform is constructed) directly to a debinding temperature within the above debinding temperature range, and the porous preform may be maintained at the debinding temperature for a specified period of time (e.g., 0.5, 1, 1.5, or 2 hours) or may be gradually elevated in temperature to a second temperature within the debinding temperature range (and may or may not be maintained at the second temperature). For example, the porous preform may be at a temperature of about 25° C. (room temperature) at the end of step (i) and then placed in an oven pre-heated to a temperature of 500° C. or 600° C., and the porous preform may be maintained at 500° C. or 600° C. for a suitable time period and/or elevated to a second debinding temperature (e.g., 650, 700, 750, or 800° C.) and maintained at the second temperature for a suitable time period. Although the foregoing embodiment is possible, it is less desirable than a gradual increase in temperature, since a sudden increase in temperature will likely introduce physical defects (e.g., cracking) into the preform. Thus, in a second embodiment, the porous preform transitions gradually from room temperature (i.e., at the end of step (i) when the porous preform is constructed) to a debinding temperature within the above debinding temperature range, and the porous preform may be maintained at the debinding temperature for a specified period of time or may be gradually elevated in temperature to another temperature within the debinding temperature range. For example, the porous preform may be at a temperature of about 25° C. at the end of step (i) and then placed in an oven not yet preheated (i.e., at room temperature) or pre-heated to a mild temperature of 50° C., and the temperature of the oven gradually increased to a debinding temperature of 500-800° C. or 500-900° C. or higher (wherein one or more debinding temperatures may be maintained for a suitable amount of time).

In some embodiments, the volatilization of the organic binder results in substantially or absolutely no residual carbon formed as a result of decomposition of the organic binder. The substantial absence of a carbon residue may be achieved by selection of a lower carbon-containing (higher oxygen-containing) organic binder and/or the conditions employed in the debinding step. For example, in some embodiments, the debinding step is conducted in an atmosphere containing hydrogen ($H_2$) gas, typically as 1-5 vol. % hydrogen admixed with argon. In some embodiments, the volatilization of the organic binder in the debinding step results in residual carbon (e.g., 0.001-0.05 wt. % by weight of the subsequent infiltrated aluminum) formed as a result of decomposition of the organic binder. Where residual carbon is desired, an inert atmosphere (e.g., argon) is used, without hydrogen. The formation of residual carbon for additional aluminum wetting and/or aluminum carbide formation may be further promoted by use of a high-carbon type of binder, such as any of the phenolic-containing polymers described earlier above.

In some embodiments, after producing the porous preform by the AM process in step (i), and before the debinding step and infiltrating step (ii), the porous preform may be subjected to a curing step to fully vaporize solvents and/or to at least partially vaporize (decompose) or cure the organic binder. The curing step subjects the porous preform to one or more conditions that induce decomposition or crosslinking of the organic binder. The curing condition may entail exposure of the preform to, for example, heat, high-energy electromagnetic radiation (e.g., ultraviolet), or chemically reactive substance incorporated into the preform, which works over time and that may be further activated by exposure to heat or electromagnetic radiation (e.g., ultraviolet or x-ray). Generally, when heat is employed, the curing temperature is below the melting point of the organic binder or metal powder. In some embodiments, and depending on the chemical composition of the organic binder and powder, the curing temperature is at least 30° C., 40° C., 50° C., or 60° C. and up to 80° C., 100° C., 120° C., 150° C., 180° C., 200° C., 220° C., or 250° C., or within a range between any two of the foregoing temperatures (e.g., 50-250° C.). In the case where the organic binder is admixed with a solvent, a separate drying step (e.g., 100° C. maintained for at least 1 hour) may be employed before the curing step or as part of the curing step to remove the solvent.

In some embodiments, after the debinding step and before infiltrating with aluminum in step (ii), the resulting binder-free porous preform is subjected to a sintering step. In other embodiments, a sintering step is omitted. As well known in the art, sintering can be achieved by subjecting the porous preform to a suitably elevated temperature, but below the melting point of the powder, at which the particles in the powder become fused. Preferably, for purposes of the invention, the sintering process results in sufficient fusing to result in a robust (i.e., infrangible) object constructed of the powder. For purposes of the invention, the sintering process typically employs a temperature within a range of 1800-2200° C. to produce a sintered porous preform. In different embodiments, the sintering temperature is, for example, 1800° C., 1850° C., 1900° C., 1950° C., 2000° C., 2050° C., 2100° C., 2150° C., or 2200° C., or a temperature within a range bounded by any two of the foregoing values.

In some embodiments, the binder-free porous preform is first cooled to a lower temperature, such as room temperature, before being subjected to a sintering temperature. In a first embodiment, the binder-free porous preform transitions abruptly from room temperature or a debinding temperature to a sintering temperature, and the porous preform may be maintained at the sintering temperature for a specified period of time (e.g., 0.5, 1, 1.5, or 2 hours) or may be gradually elevated in temperature to a second higher sintering temperature within the sintering temperature range (and may or may not be maintained at the second temperature). For example, the binder-free porous preform may be at a temperature of about 25° C. (room temperature) after debinding and then placed in an oven pre-heated to a sintering temperature, and the binder-free porous preform may be maintained at the sintering temperature for a suitable time period and/or elevated to a second sintering temperature and maintained at the second temperature for a suitable time period. Although the foregoing embodiment is possible, it is less desirable than a gradual increase in temperature, since a sudden increase in temperature will likely introduce physical defects (e.g., cracking) into the preform. Thus, in a second embodiment, the binder-free porous preform transitions gradually from room temperature or a debinding temperature to a sintering temperature within the above sintering temperature range, and the binder-free porous preform may be maintained at the sintering temperature for a specified period of time or may be gradually elevated in temperature to another sintering temperature within the sintering temperature range. For example, in some embodiments, the porous preform may be at a temperature of about 25° C. after debinding and then placed in an oven not yet preheated (i.e., at room temperature) or pre-heated to a mild temperature of 50° C.-250° C. (which may function as a curing step), and the temperature of the oven gradually increased to a debinding temperature of 500-900° C. or higher (wherein one or more debinding temperatures may be maintained for a suitable amount of time), followed by further gradual increasing of the temperature to a sintering temperature (wherein one or more sintering temperatures may be maintained for a suitable amount of time, as discussed above).

In some embodiments, the boron carbide particles, either before or after forming the porous preform, are passivated (i.e., buffered or coated) with a material that improves wetting of aluminum or reduces reactivity of boron carbide with aluminum, or both. The passivating material may be, for example, a metal boride (e.g., $TiB_2$ or $AlB_2$) or metal carbide (e.g., SiC) or the result of thermal passivation of $B_4C$ in an oxygen-containing environment. In other embodiments, the boron carbide particles are not passivated before contacting with molten aluminum in step (ii). Notably, when the composite is being applied as a collimator material, the reaction between boron carbide and aluminum may be permissible, which may thus permit dispensing with passivation.

After the debinding step or sintering step, the resulting binder-free (and optionally, sintered) porous preform is subjected to an aluminum infiltrating step, which may be referred to as step (ii). In the aluminum infiltrating step, molten aluminum, which may be a pure aluminum or aluminum alloy, as described above, is infiltrated (i.e., impregnated, permeated, or diffused) into pores of the binder-free porous preform. Once the aluminum is infiltrated into pores of the binder-free porous preform, an object constructed of boron carbide and aluminum is produced. Any method capable of infiltrating molten aluminum into pores of a material may be used. In order for the aluminum to be molten and diffuse into pores, the aluminum (and porous preform) needs to be at a temperature above the melting point of aluminum of 660° C. or above the melting temperature of an aluminum alloy being used. For purposes of the invention, the molten aluminum is typically at a temperature of at least or above 1000° C. when infiltrating. In different embodiments, the molten aluminum is at a temperature of 1000, 1050, 1100, 1150, 1200, 1250, 1300, 1350, or 1400° C., or a temperature within a range bounded by any two of the foregoing values (e.g., 1000-1400° C., 1100-1400° C., 1200-1400° C., 1250-1400° C., or 1300-1400° C.) when infiltrating the aluminum into pores of the preform. A higher temperature (e.g., 1500° C., 1600° C., 1700° C., or 1800° C.) can theoretically be used; however, for purposes of the invention, such higher temperatures provide little if any additional benefit. Theoretically, the aluminum and porous preform can be at a temperature up to or below the boiling point of aluminum (2470° C.) and below the melting temperature of $B_4C$ (3036° C.) during the infiltrating step. The aluminum is preferably included in an amount substantially equivalent in volume to the pore space present in the binder-free porous preform. By using an amount of aluminum substantially equivalent in volume to the pore space, the full pore space will become occupied with aluminum without an aluminum overhang.

In some embodiments, the infiltrating step is conducted in an inert gas (e.g., argon) and/or reducing gas (e.g., hydrogen) atmosphere. Hydrogen, if present, may be included in an amount of, e.g., 1, 2, 3, 4, or 5 vol. %, as described above for the debinding step. In other embodiments, the infiltrating step may be conducted in a vacuum of $10^{-2}$-$10^{-4}$ Torr, or more typically, a vacuum of about $10^{-3}$ Torr. Notably, it has herein been found that use of a pressure greater than $10^{-2}$ Torr may have an adverse effect with aluminum infiltration because the Al can oxidize and create a protection skin around itself that does not wet ceramic carbide powders, while a pressure below $10^{-4}$ Torr may have an adverse effect of impeding infiltration along with an unacceptable level of vaporization.

In some embodiments, the infiltrating step (ii) includes resting the binder-free porous preform on top of or under a mass of aluminum while the binder-free porous preform and aluminum are within a temperature-controlled enclosure, and raising the temperature of the enclosure to at least the melting point of aluminum (more typically, at least or above 1000° C., as set forth above) during the infiltrating process to result in melting and infiltration of the aluminum into pores of the binder-free porous preform by capillary action. The mass of aluminum may be, for example, an ingot or bar of aluminum, or alternatively, bed of aluminum powder. Regardless of the arrangement, the aluminum and porous preform need to be in contact with each other when the aluminum is in the molten state.

In some embodiments, the binder-free porous $B_4C$ preform and aluminum are gradually heated, starting at a temperature below the melting point of aluminum (e.g., room temperature or debinding temperature), at any suitable rate of temperature increase, as provided above, such as, for example, 1° C./min, 2° C./min, 5° C./min, 10° C./min, 15° C./min, or 20° C./min, to reach a temperature above the melting point of aluminum or aluminum alloy (i.e., any of the exemplary infiltrating temperatures provided above). If a sintering step is included, the sintered porous preform is first typically cooled to a temperature below the melting point of aluminum (e.g., room temperature) before being placed in contact with the aluminum, with the temperature gradually increasing to a temperature above the melting point of aluminum. To permit sufficient time for the aluminum to infiltrate into all pores of the binder-free porous preform, the preform and aluminum should be maintained at one or more temperatures above the melting point of aluminum for a period of at least ore more than 30, 45, 60, 90, 120, 150, or 180 minutes (or even longer times, e.g., 4, 5, 6, 7, or 8 hours).

The present invention is also directed to methods for substantially quickening the infiltration time (e.g., 5 or 10 seconds to 1, 2, or 5 minutes). In one embodiment, the preform and aluminum may be heated in an induction oven. In another embodiment, the preform may be dipped or submerged into a bath of molten aluminum. In yet another embodiment, the preform may be placed in contact with a sacrificial runner in which aluminum is poured, wherein the sacrificial runner may advantageously be removable. Aside from the benefit in time reduction, the quickened infiltration may provide a further advantage of reducing the reaction between aluminum and boron carbide, thereby reducing the amount of reactive phase in the composite.

After the pores of the preform have been completely infiltrated with aluminum, the resulting object is constructed of an extended bonded network of particles of boron carbide, along with aluminum occupying the interstitial (i.e., void or pore) spaces between boron carbide particles. Thus, at the end of the infiltrating step, the porous preform has been converted to a non-porous composite object. The resulting aluminum-infiltrated object is then cooled to result in solidification of the aluminum in the porous preform. The resulting non-porous object typically includes a ternary phase of aluminum, boron, and carbon (i.e., $Al_3BC$), which typically forms a rim structure surrounding the $B_4C$ particles. Additional phases may form when an aluminum alloy is used. For example, if the aluminum contains magnesium or copper, a $MgAl_2$ or $Al_2Cu$ phase may also form, respectively.

Generally, the $B_4C$—Al composite structure, as produced herein, possesses a high density of at least or greater than 2.0, 2.1, 2.2, 2.3, 2.4, 2.5, or 2.6 g/cm$^3$ for the completed part infiltrated with aluminum and cooled to room temperature. The $B_4C$—Al composite structure, as produced herein, may also possess a theoretical density (TD) of at least or above 90%, 92%, 95%, 96%, or 97%. The $B_4C$—Al composite structure, as produced herein, may also possess a Vickers hardness of at least or above 150, 180, 200, 220, 240, 250, 260, 270, or 280 HV.

Examples have been set forth below for the purpose of illustration and to describe certain specific embodiments of the invention. However, the scope of this invention is not to be in any way limited by the examples set forth herein.

EXAMPLES

Overview

In the following experiments, printed $B_4C$ collimator geometries were infiltrated with three Al grades, including AA2024, AA1100, and pure Al, which resulted in metal matrix composites with significant strength well above that of printed- and resin-infiltrated $B_4C$. Alloy AA2024, in particular, was infiltrated at three different temperatures, which resulted in a variation in phases formed. The composites are robust materials that are particularly suited for use in collimator devices. Neutron scattering patterns were obtained for two $B_4C$ collimators of the same geometry, one of which was infiltrated with superglue and the other infiltrated with AA2024.

Experimental

Figure 1B:
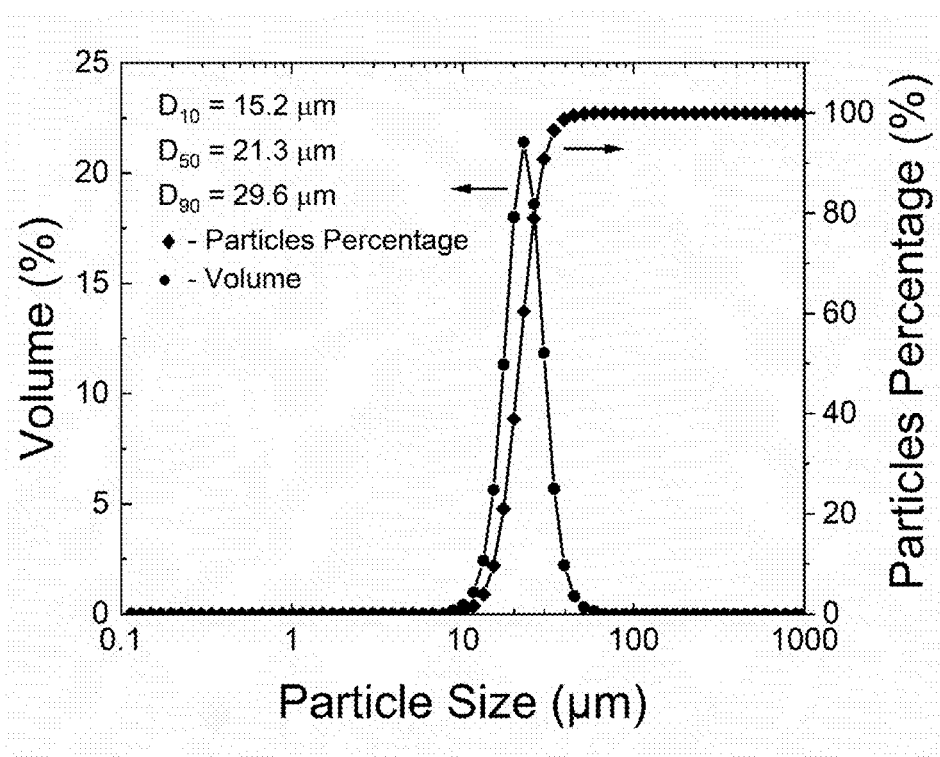
FIG. 1B is a plot of Horiba data showing the size distribution of the particles in the $B_4C$ powder.

The material used for printing was $B_4C$ powder (18 μm, 99.9% purity). The material used for infiltration was sheet metal or shot pieces of Al in three grades, including AA2024, AA1100, and pure Al shot (99.999% purity). Cyanoacrylate superglue was used to consolidate collimators without Al, for comparison. Horiba laser scatter particle distribution analysis and scanning electron microscopy (SEM) were performed on the $B_4C$ powder to determine the morphology, size, and distribution. The size distribution was very narrow, with average particle size of 21.3 μm. A SEM image of the $B_4C$ powder is shown in FIG. 1A, and the Horiba particle size data is plotted in FIG. 1B. FIGS. 1A and 1B show the size and morphology of the boron carbide powder herein used.

Binder Jet Printing of $B_4C$ Preforms and Subsequent Al Infiltration $B_4C$ preforms were printed using an ExOne® X1-Lab binder jet machine. The binder jet process works by repeatedly spreading layers of powder with a roller and selective deposition of a binder with an inkjet print-head. The following print parameters were used to deposit the $B_4C$: the print-head speed was 150 mm/s, each printed layer was 100 μm thick, the powder spread velocity was 25 mm/s, and binder saturation and powder packing were 80% and 40%, respectively. The powder packing value was not measured, but due to the weight and size of the powder, it was estimated to be around 60%. The samples were collimator geometries with mesh sizing from 1.5-5 mm thick. Following printing, the samples were cured in a curing oven at 200° C. in air to crosslink the polymer bonding the $B_4C$ particles. The printed ("green") parts were recovered from the powder bed after curing was completed.

Figure 2:
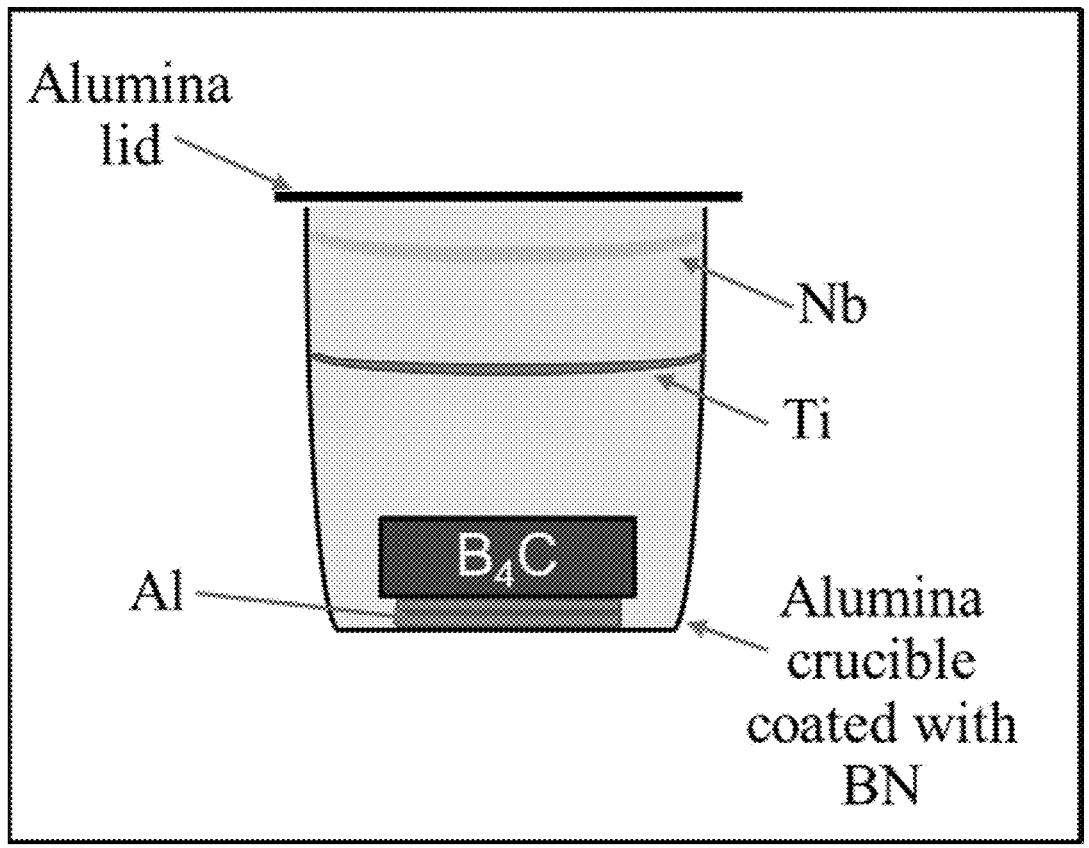
FIG. 2 is a depiction of an apparatus used for aluminum infiltration into a porous $B_4C$ preform.

Once the $B_4C$ powder was printed into preforms of collimator geometries, the binder was cured and the dried preform was infiltrated with cyanoacrylate resin to hold the samples together for transport to a furnace for subsequent Al infiltration. Infiltration was performed in a graphite furnace, with the setup shown in FIG. 2. As shown in FIG. 2, the porous $B_4C$ preform was placed in an alumina crucible coated with boron nitride (BN), and solid aluminum was placed on top of the preform. For purposes of the invention, the alumina crucible also included separate coatings of Nb and Ti, which serve as oxygen getters (i.e., for the consumption of oxygen) during the course of the infiltration. Three infiltration temperatures of 1200°, 1300° C., and 1400° C. were performed with AA2024, while AA1100 and pure Al were infiltrated at 1200° C.

The specimen microstructures were analyzed with a scanning electron microscope (SEM) in backscatter electron imaging mode. Archimedes and geometric densities were measured when appropriate by measuring the dry and alcohol-submerged masses as well as dimensions. Optical images were taken, and computational stitching of the images was used to display full cross-sections. Phase composition was determined by x-ray diffraction (XRD) using a diffractometer with Mo K-α radiation (λ, =0.709319 Å). The operating parameters were 40 kV and 40 mA, with a 2θ step size of 0.02. The XRD patterns were analyzed using the whole pattern fitting approach with the MDI Jade 2010 software database. Vickers hardness measurements were performed using a LECO LM 110AT apparatus under a 0.2 kgf load with a dwell time of 15 seconds.

To verify that $B_4C$ infiltrated with aluminum is indeed useful for collimation on neutron scattering instruments, two incident beam collimators of precisely the same geometry were tested on the Spallation Neutrons and Pressure (SNAP) diffractometer of the Spallation Neutron Source (SNS) at Oak Ridge National Laboratory (S. Calder et al., "A suite-level review of the neutron powder diffraction instruments at Oak Ridge National Laboratory," *Rev. Sci. Instrum.*, vol. 89, no. 9, p. 092701, September 2018). One collimator was printed from natural $B_4C$ and infiltrated with EZ-bond and the other was infiltrated with AA2024. The collimators were tested on a silicon powder sample contained inside a null-scattering TiZr gasket placed into a single-toroidal Paris-Edinburgh (PE) cell with cubic boron nitride (cBN) anvils (S. KLOTZ, Techniques in high pressure neutron scattering. CRC Press, 2016, ISBN 9781138199217). The PE cell was placed in a configuration into the SNAP beamline where the neutron beam enters and diffracts through the gasket. The incident beam collimator tested aims to shield the cell and anvils from exposure to the neutron beam while providing a beam aperture of 750 μm×5 mm in front of the sample.

Results and Discussion

Figures 3A, 3B:
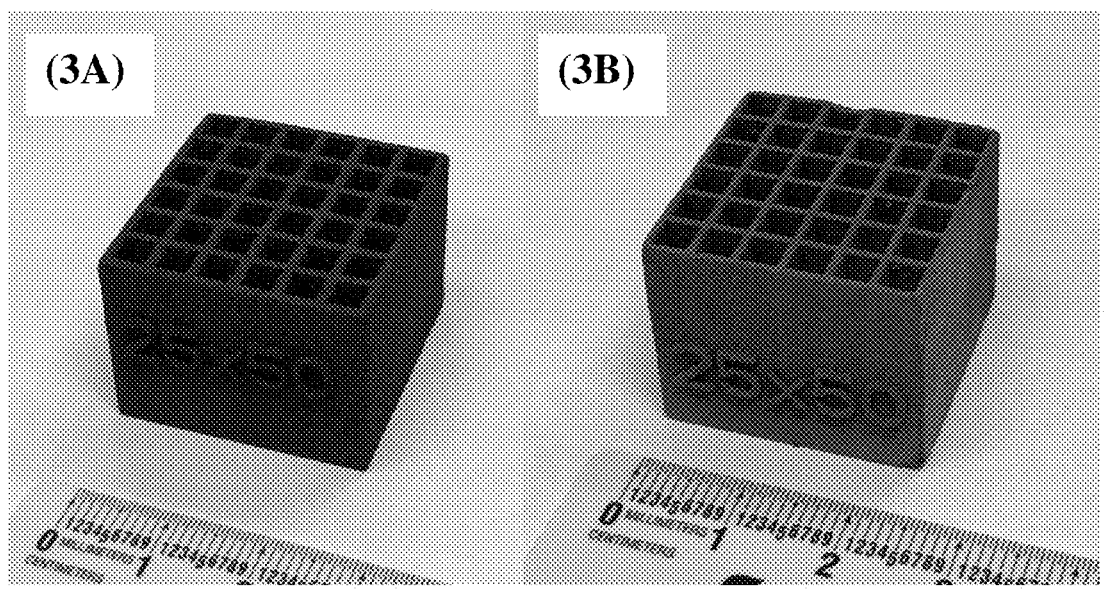
FIG. 3A is a macro image of a printed $B_4C$ preform (as produced by binder jetting)
FIG. 3B is a macro image of an Al-infiltrated version of the $B_4C$ preform, which can be used as a collimator.

FIG. 3A is a macro image of a printed ("green") $B_4C$ preform printed in a collimator geometry, and FIG. 3B is a macro image of an Al-infiltrated composite of the B$_4$C preform. Green B$_4$C samples have clean, crisp edges after de-powdering. The samples taken directly from the powder bed appear to be uncompromised. FIG. 3A was taken before transport. In FIG. 3B, the chipped edge was a result of handling the preform just prior to cyanoacrylate resin infiltration and Al infiltration. The infiltrated samples retained their geometry. The lighter hue in the infiltrated sample is most likely a result of the lighter-colored Al present in the sample.

Figures 4A, 4B, 4C, 4D, 4E:
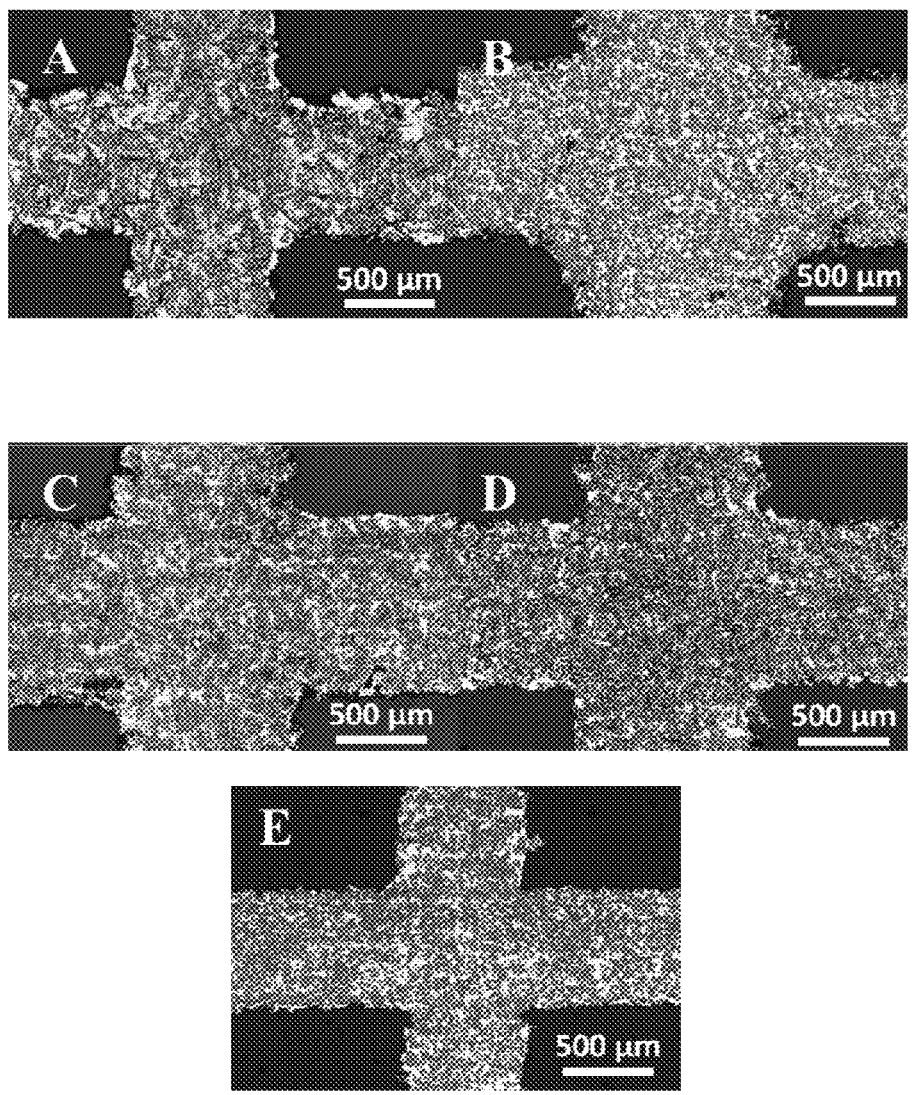
FIGS. 4A-4E are optical images of cross-sections of specimens infiltrated with aluminum under the following conditions: AA2024 at 1400° C.

FIGS. 4A-4E show optical images of cross-sections of porous B$_4$C specimens (as prepared by binder jetting) infiltrated with aluminum as follows: AA2024 at 1400° C. (FIG. 4A), AA2024 at 1300° C. (FIG. 4B), AA2024 at 1200° C. (FIG. 4C), AA1100 at 1200° C. (FIG. 4D), and pure Al at 1200° C. (FIG. 4E), wherein AA2024 and AA1100 refer to specific types of aluminum alloys, as discussed above. The images show full Al infiltration into the B$_4$C preforms and residual closed porosity, which can be from local decreased wetting or trapped air. Table 1 (later below) shows the density measurements from the Archimedes technique, and they are all higher than 94% TD. Densities are high as the porous B$_4$C preforms form a dense composite upon infiltration. From the optical images, some residual porosity can be observed. The shaping is maintained and there is a level of roughness of the walls, which is most likely influenced by the B$_4$C particle size. For all samples, except the sample infiltrated with AA2024 at 1300° C. as shown in FIG. 4B, the Al infiltrates well and fills the void space of the B$_4$C, resulting in highly dense composites. For the sample infiltrated with AA2024 at 1400° C. in FIG. 4A, there appears to be larger reinforcement particles. For the sample infiltrated with AA1100 at 1200° C. in FIG. 4D, higher packing of the reinforcement particles is observed. For all processed samples, there is ample shape retention, even though no scans of the part are provided, and this is from the Al infiltrating and filling pores instead of solid-state or liquid-phase sintering.

Figure 5:
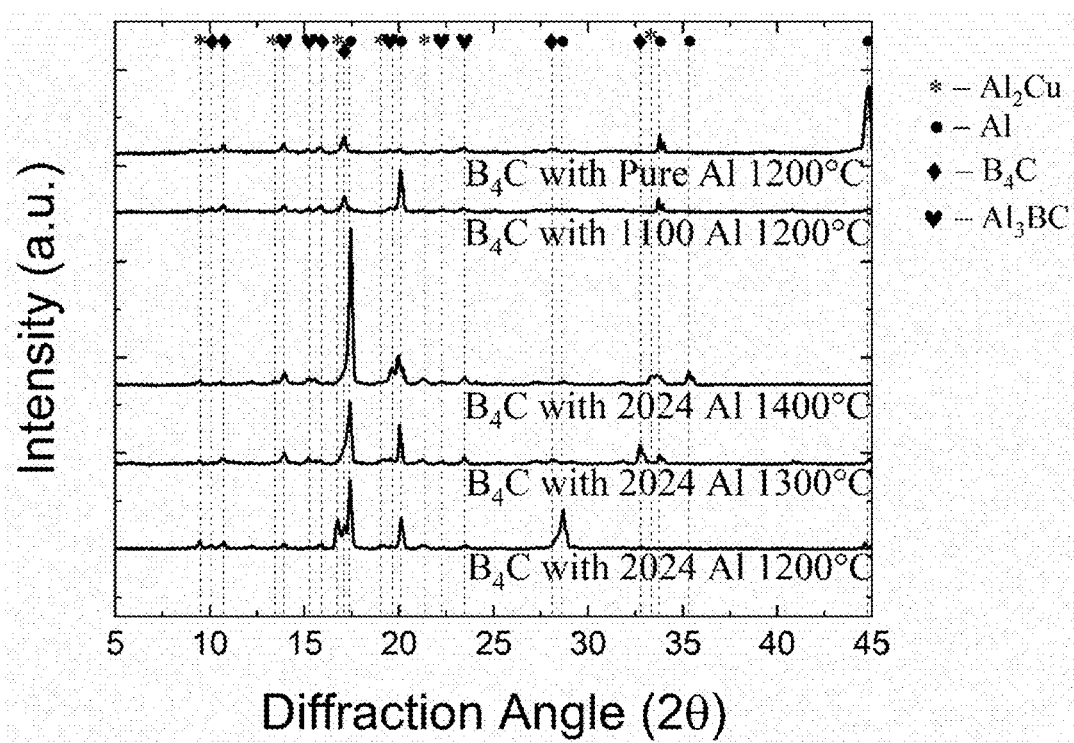
FIG. 5 shows XRD scans of the five specimens of Al-infiltrated $B_4C$ composites shown in FIGS. 4A-4E.

FIG. 5 shows the XRD scans of the composite samples described above. The XRD scans indicate the presence of a number of phases present after processing. The sample infiltrated with pure Al contains B$_4$C, Al, and Al$_3$BC. For the samples infiltrated with Al alloy, extra phases containing metal intermetallics or another ternary are formed. For all samples, the Al$_3$BC phase appears to be present. The sample infiltrated with AA1100 forms Al$_3$BC and some MgAl$_2$. The samples infiltrated with AA2024 have more phases formed, including Al$_3$BC, MgAl$_2$, and Al$_2$Cu at 1300° C., and all of these are present in the samples processed at 1200 and 1400° C. The sample processed with AA2024 at 1200° C. shows the presence of an extra intermetallic, Al$_4$Cu$_9$. The sample processed with AA2024 at 1400° C. shows the presence of an additional Al$_4$Cu$_9$ phase and also an additional Al$_{0.5}$B$_{12.74}$C$_2$ phase. The additional phases in the samples processed at 1400° C. are a result of the higher temperature because the higher temperature encourages diffusion and reaction.

Figure 6:
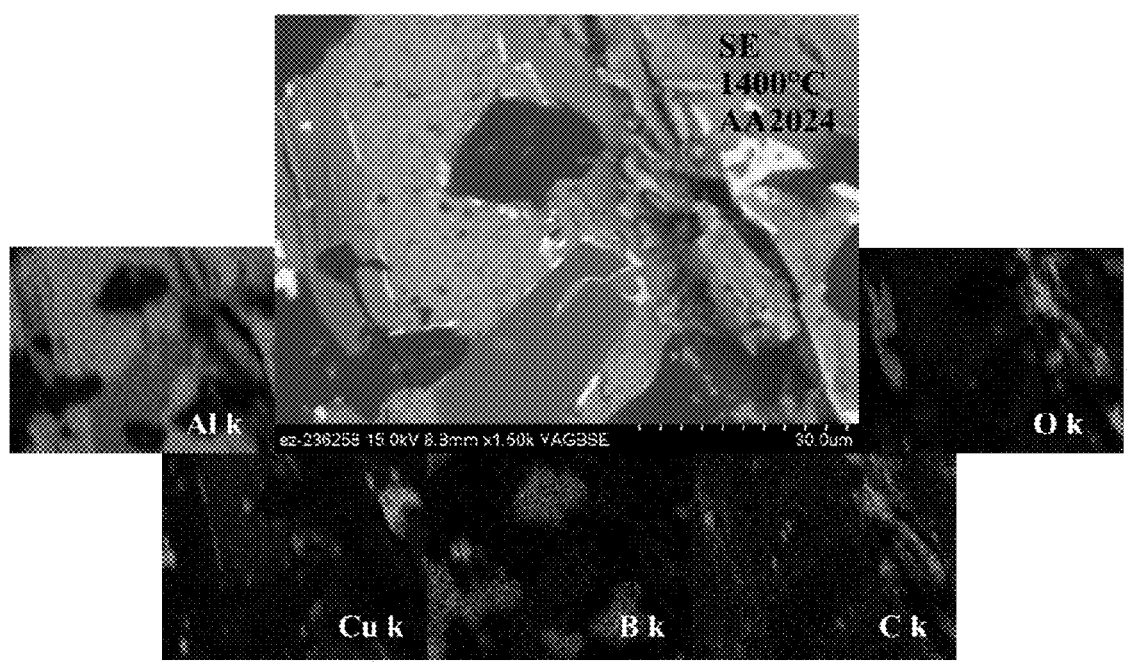
FIG. 6 includes a SEM image (center) and surrounding EDS scans of cross-sections of a B$_4$C porous sample, as produced by binder jetting, infiltrated with AA2024 at 1400° C.
Figure 7:
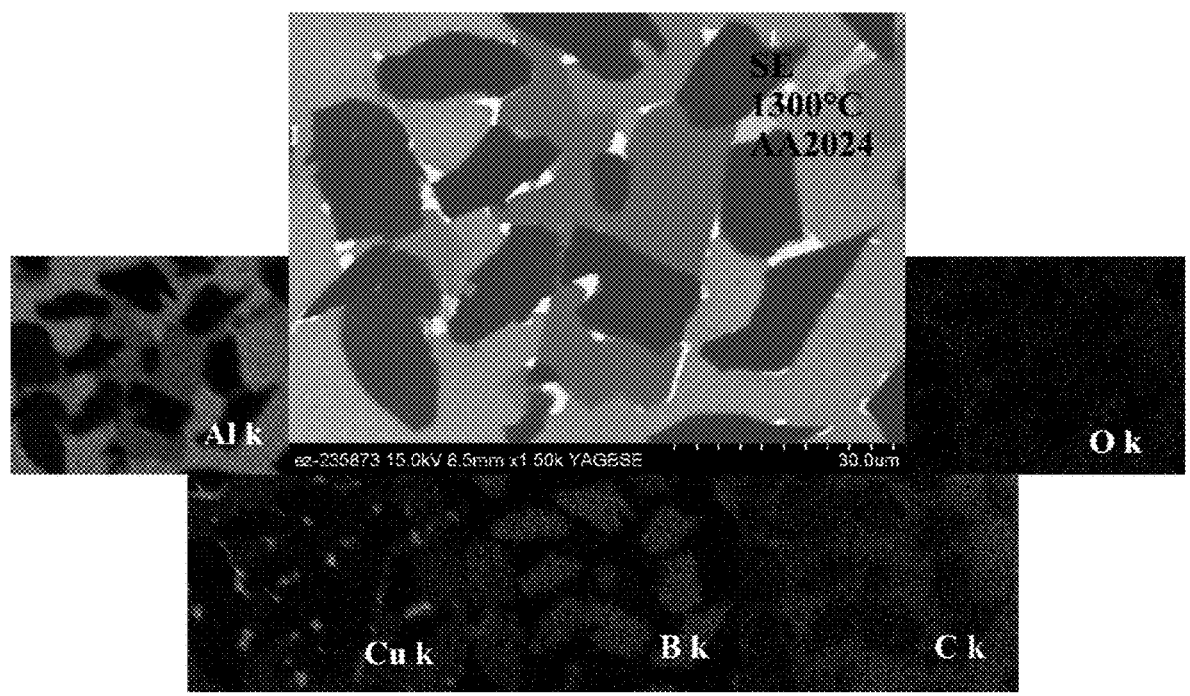
FIG. 7 includes a SEM image (center) and surrounding EDS scans of cross-sections of a B$_4$C porous sample, as produced by binder jetting, infiltrated with AA2024 at 1300° C.
Figure 8:
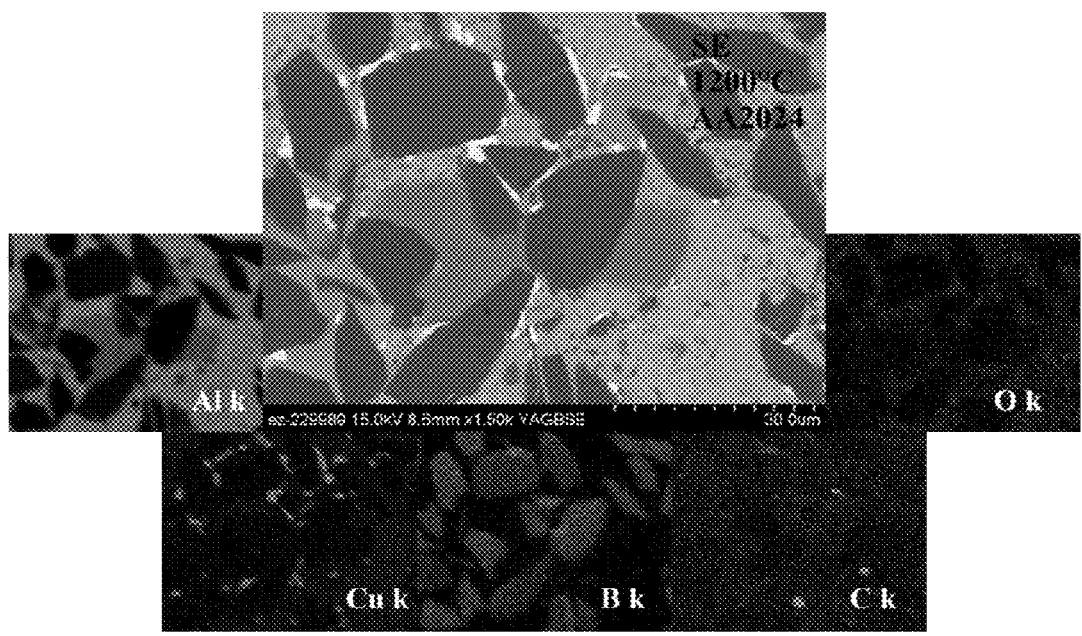
FIG. 8 includes a SEM image (center) and surrounding EDS scans of cross-sections of a B$_4$C porous sample, as produced by binder jetting, infiltrated with AA2024 at 1200° C.
Figure 9:
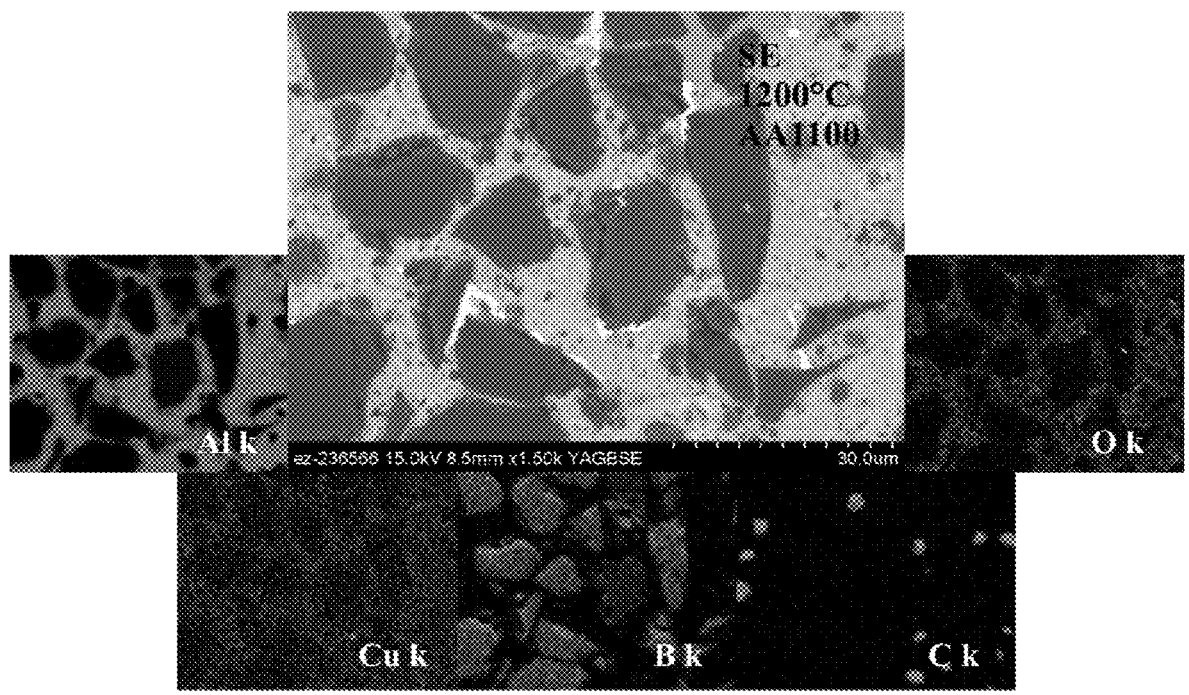
FIG. 9 includes a SEM image (center) and surrounding EDS scans of cross-sections of a B$_4$C porous sample, as produced by binder jetting, infiltrated with AA1100 at 1200° C.
Figure 10:
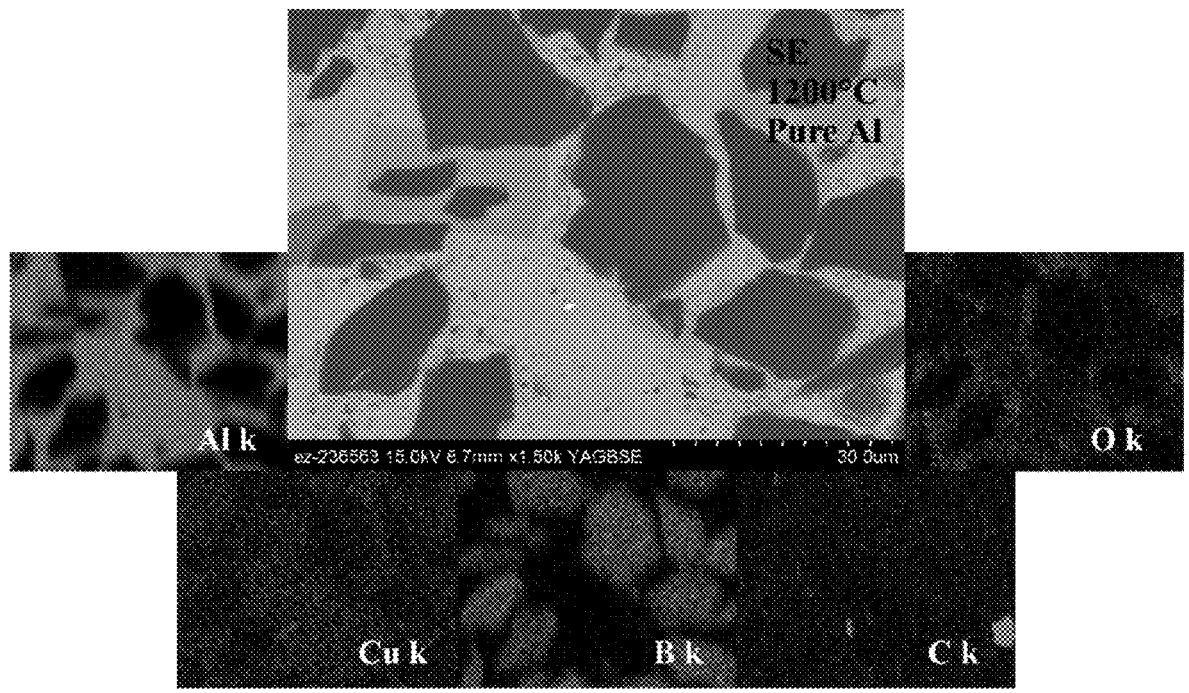
FIG. 10 includes a SEM image (center) and surrounding EDS scans of cross-sections of a B$_4$C porous sample, as produced by binder jetting, infiltrated with pure Al at 1200° C.

Each of FIGS. 6-10 contains a central backscatter SEM image, along with surrounding EDS elemental mapping images, with different elemental mapping shown (i.e., from left to right, Al, Cu, B, C, and O). FIG. 6 shows SEM and EDS scans of cross-sections of B$_4$C sample infiltrated with AA2024 at 1400° C.; FIG. 7 shows SEM and EDS scans of cross-sections of B$_4$C sample infiltrated with AA2024 at 1300° C.; FIG. 8 shows SEM and EDS scans of cross-sections of B$_4$C sample infiltrated with AA2024 at 1200° C.; FIG. 9 shows SEM and EDS scans of cross-sections of B$_4$C sample infiltrated with AA1100 at 1200° C.; and FIG. 10 shows SEM and EDS scans of cross-sections of B$_4$C sample infiltrated with pure Al at 1200° C.

With respect to FIG. 6, which shows the SEM image (center) and surrounding EDS images of a cross-section of the B$_4$C sample infiltrated with AA2024 at 1400° C., originally, it was believed that 1400° C. was needed to get enough surface reaction and wetting for Al to fully infiltrate. The microstructure shows original materials as well as reacted products. There are flakes and cracks within phases formed. In FIG. 6 (as well as FIGS. 7-10) the black phase is B$_4$C, the dark gray phase is the ternary Al$_3$BC, and the light gray phase is the Al matrix. The Al matrix appears to also have some small amount of another phase in it. The XRD indicates that this other phase may be Al$_4$Cu$_9$ or Al$_{0.5}$B$_{12.74}$C$_2$. There may also be some oxide formed in this region. The white phase is Al$_2$Cu.

FIG. 7 shows the microstructure of the B$_4$C sample infiltrated with AA2024 at 1300° C. FIG. 7 is the SEM and EDS of a higher magnification spot in FIG. 4. There are less cracks and flakes formed, which is most likely from a lower processing temperature. The black phase is B$_4$C. Also, less oxide is formed in this sample as indicated by the O k (oxygen) signal. The white phase is Al$_2$Cu. The larger reinforcement particles observed in the optical image in FIG. 4A are not B$_4$C particles, but rather, B$_4$C particles with ternary phase formed around them, which makes them appear larger. From the XRD data, there is more ternary phase formed in this sample than others.

FIG. 8 shows the microstructure of the B$_4$C sample infiltrated with AA2024 at 1200° C. This sample is consistent with the phases formed at 1400° C., but the sample appears to have less oxide, flakes, and cracks formed. The microstructure shows original materials as well as reacted products. This other phase may be Al$_4$Cu$_9$, according to the XRD. There may also be some oxide formed in this region.

FIG. 9 shows the microstructure of the B$_4$C sample infiltrated with AA1100 at 1200° C. The microstructure shows the presence of original materials as well as reacted products. According to the XRD, there may also be some oxide formed in this region, and the white phase may also be MgAl$_2$.

FIG. 10 shows the microstructure of the B$_4$C sample infiltrated with pure Al at 1200° C. The Al has made a good interface with the B$_4$C particles, much like the AA2024 sample, which is in contrast to the sample processed with AA1100. According to the XRD, the only other phase present is the ternary phase. There may also be some oxide formed in this region.

Hardness testing was performed on all the samples, and the values are listed in Table below. The hardness is higher than for Al alloys reinforced with B$_4$C, due to higher B$_4$C content (I Topcu et al., *J. Alloys Compd.*, vol. 482, no. 1-2, pp. 516-521, August 2009). Typically, ternary phases are more brittle, but despite the brittle ternary phases formed in the composite herein, the hardness values are still comparable to other B$_4$C—Al composites of the art made by infiltration and also have comparable hardness to a common hard coating of TiB$_2$ (B.-S. Lee and S. Kang, *Mater. Chem. Phys.*, vol. 67, no. 1-3, pp. 249-255, January 2001).

TABLE 1

Properties of infiltrated samples.

|  | Preform | AA2024, 1200° C. infiltration | AA2024, 1300° C. infiltration | AA2024, 1400° C. infiltration | AA110, 1200° C. infiltration | Pure Al, 1200° C. infiltration |
|---|---|---|---|---|---|---|
| Density (g/cc, % TD) | 1.00, 40.6 | 2.54, 95.0 | 2.53, 94.5 | 2.61, 96.9 | 2.54, 94.7 | 2.59, 96.8 |
| Hardness (HV) | n/a | 223 ± 79 | 265 ± 91 | 283 ± 110 | 168 ± 92 | 154 ± 81 |
| Shape retention | n/a | yes | yes | yes | yes | yes |

Figure 11:
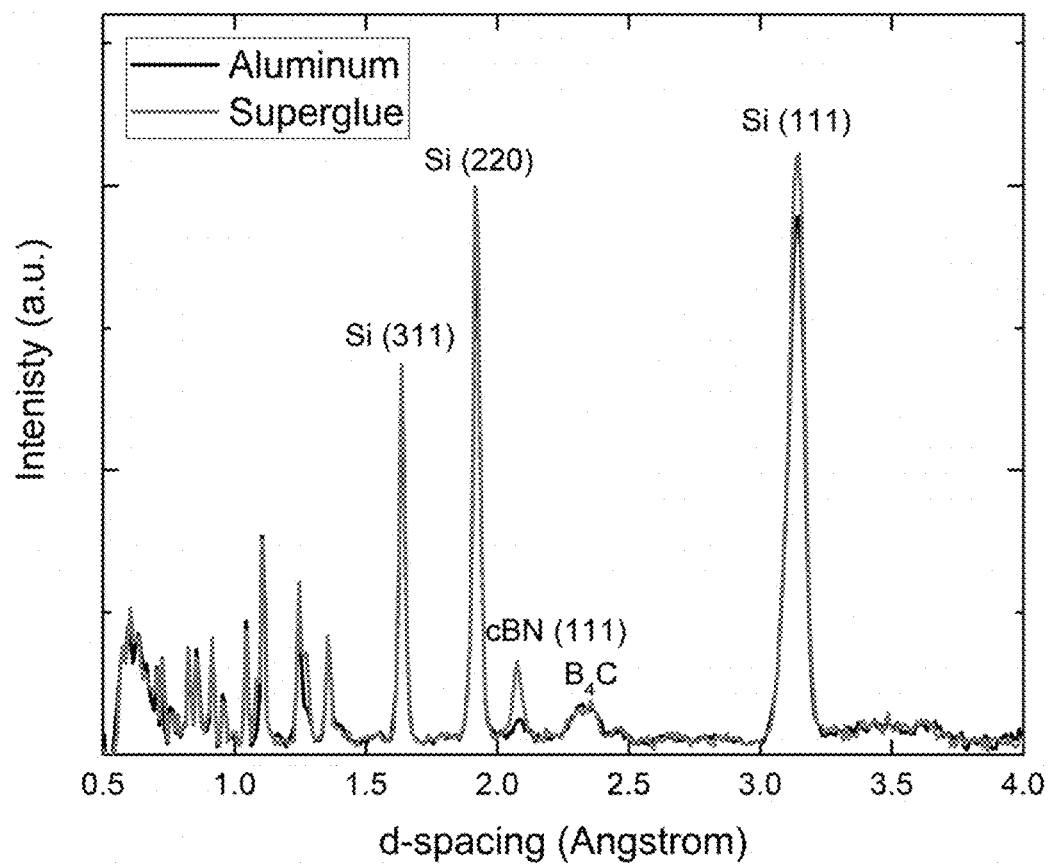
FIG. 11 shows diffraction data from a silicon sample in a TiZr gasket inside a Paris-Edinburg cell equipped single-toroidal cBN anvils. The data are reduced to 1D and normalized through a background fit using standard SNAP procedures. Two different incident beam collimators shielded from parasitic scattering, one from 3D-printed B$_4$C infiltrated with superglue (upper gray line, i.e., with taller peaks) and one from 3D-printed B$_4$C infiltrated with aluminum (lower black line, i.e., with shorter peaks). The first three silicon diffraction peaks are indicated together with scatter attributed to surface scatter from the B$_4$C and cBN scatter arising from imperfect shielding of the anvil.

FIG. 11 shows neutron diffraction data of a silicon sample in the Paris-Edinburgh cell using the two collimators, infiltrated with superglue and with Al. The $B_4C$ infiltrated with aluminum is indeed slightly superior in terms of scattering properties. First, scatter arising from $B_4C$ seems comparable for both collimators and is due to surface scatter closest to the sample. Furthermore, no significant aluminum scatter due to the aluminum infiltration is observed, additional scatter that would have been detrimental. Most importantly, however, while the sample peaks (silicon) appear somewhat stronger in the superglue case, additional unwanted scatter from the anvil (cBN) is also visible. This indicates that the superglue-infiltrated collimator does not shield as well, which may be due to densification of the collimator upon aluminum infiltration. Thus, $B_4C$ infiltrated with aluminum provides a useful collimation material. It is somewhat superior to those infiltrated with superglue in terms of scattering properties and vastly superior in terms of structural stability.

In summary, highly dense $B_4C$—Al composites were produced using BJAM to print $B_4C$ powder preforms that were subsequently melt-infiltrated in a pressureless process with pure aluminum or an aluminum alloy. The $B_4C$ preforms absorbed molten Al at elevated temperatures and formed extra interfacial phases, such as ternary $Al_3BC$, to help achieve full infiltration. The above described process can achieve a very high density, e.g., 97% TD. It has also been found that the net shaping of the printed part was retained, so parts can be used for applications without further machining. The Vickers hardness of the composite are as high as 283 HV. The neutron diffraction data shows that the sample infiltrated with Al had less scatter and shielded better than the sample infiltrated with superglue. By using BJAM and pressureless melt infiltration for processing, efficient production of collimator devices with complex shapes and superior physical properties has herein been realized.

While there have been shown and described what are at present considered the preferred embodiments of the invention, those skilled in the art may make various changes and modifications which remain within the scope of the invention defined by the appended claims.

What is claimed is:

1. A composite object useful as a neutron collimating device comprising:
   (i) a bonded network of boron carbide particles in which the boron carbide particles are bonded to each other and provide a shape to the composite object; and
   (ii) aluminum occupying spaces between the boron carbide particles, provided that the aluminum does not completely surround the boron carbide particles;
   wherein the boron carbide is present in the composite object in an amount of 30-70 wt. % and wherein the boron carbide particles have a size characterized by a $D_{10}$ size distribution parameter of 15 microns.

2. The composite of claim 1, wherein said boron carbide particles have a size of no more than 120 microns.

3. The composite of claim 1, wherein said boron carbide particles are enriched in boron-10.

4. The composite of claim 1, wherein the aluminum is pure aluminum.

5. The composite of claim 1, wherein the aluminum is an aluminum alloy containing at least 50 wt. % of aluminum.

6. The composite of claim 1, wherein the boron carbide is present in the composite object in an amount of 35-60 wt. %.

7. The composite of claim 1, wherein the bonded network of boron carbide particles has a honeycomb or rectangular grid shape.

8. A composite object useful as a neutron collimating device comprising:
   (i) a bonded network of boron carbide particles in which the boron carbide particles are bonded to each other and provide a shape to the composite object; and
   (ii) aluminum occupying spaces between the boron carbide particles, provided that the aluminum does not completely surround the boron carbide particles;
   wherein the boron carbide is present in the composite object in an amount of 30-70 wt. % and wherein the boron carbide particles have a size characterized by a $D_{10}$ size distribution parameter of 20 microns.

* * * * *